Figure 3:
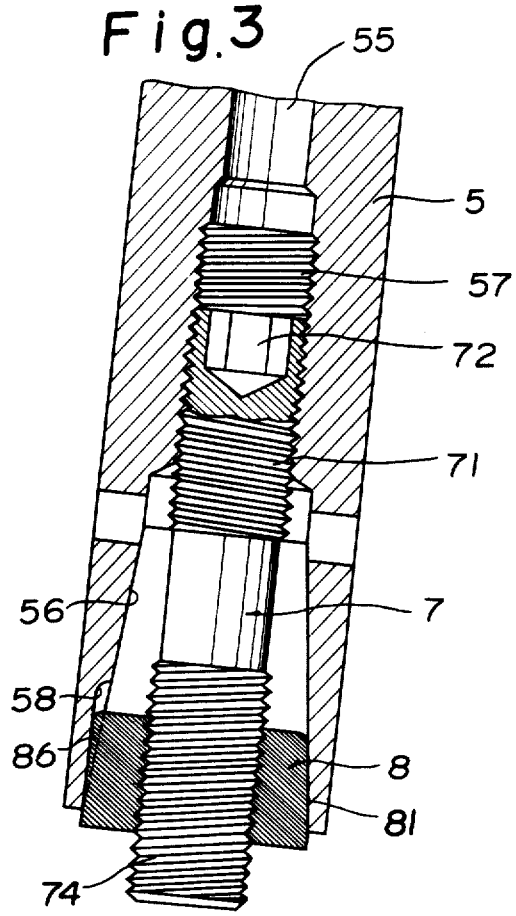

United States Patent [19]

Katayama

[11] 4,310,260
[45] Jan. 12, 1982

[54] FIXING DEVICE FOR FIXING A HANDLE STEM TO A FRONT FORK AT A BICYCLE

[75] Inventor: Hitoshi Katayama, Sakai, Japan

[73] Assignee: Shimano Industrial Company Limited, Osaka, Japan

[21] Appl. No.: 213,098

[22] Filed: Dec. 4, 1980

Related U.S. Application Data

[63] Continuation of Ser. No. 55,390, Jul. 6, 1979, abandoned.

[30] Foreign Application Priority Data

Jul. 12, 1978 [JP] Japan .............................. 53-96438[U]

[51] Int. Cl.³ .......................................... B62K 21/18
[52] U.S. Cl. ........................................ 403/7; 403/374; 74/551.1
[58] Field of Search ............... 403/374, 370, 7, 8, 403/104; 74/551.1, 551.2, 551.3, 551.6

[56] References Cited

U.S. PATENT DOCUMENTS

| | | | |
|---|---|---|---|
| 2,010,525 | 8/1935 | McHugh | 403/7 |
| 2,523,402 | 9/1950 | Townsend | 74/551.2 |
| 2,602,493 | 7/1952 | Burdick | 403/7 |
| 2,842,233 | 7/1978 | Greenleaf | 403/370 |
| 3,776,651 | 12/1973 | Peter | 403/370 X |
| 3,924,978 | 12/1975 | Loyd, Jr. | 403/374 X |
| 4,068,858 | 1/1978 | Harrison | 403/370 X |
| 4,108,461 | 8/1978 | Hopper | 403/374 X |

Primary Examiner—Andrew V. Kundrat
Attorney, Agent, or Firm—Stevens, Davis, Miller & Mosher

[57] ABSTRACT

A fixing device for fixing a handle stem to a front fork at a bicycle. A screw thread is provided at the inner periphery of the hollow handle, with which is screwed a handle expander bolt having a rotary control and carrying an expander cone, so that the expander bolt is screwed forward and backward with the thread, thereby moving the expander cone with respect to the handle stem.

5 Claims, 4 Drawing Figures

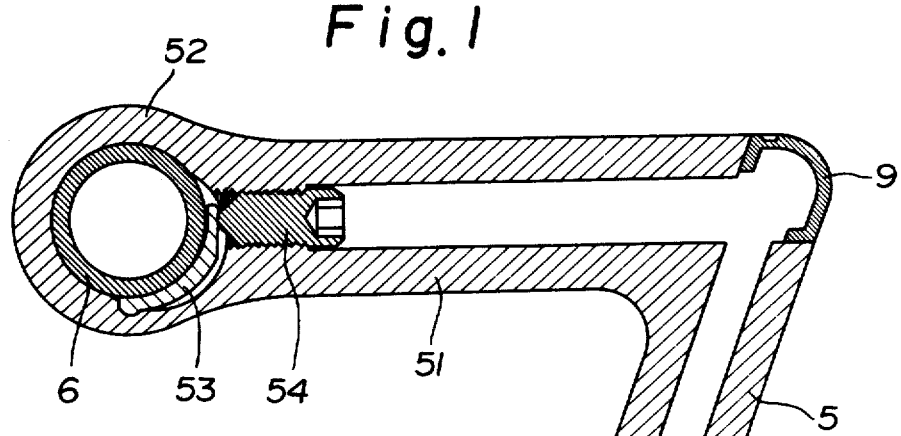
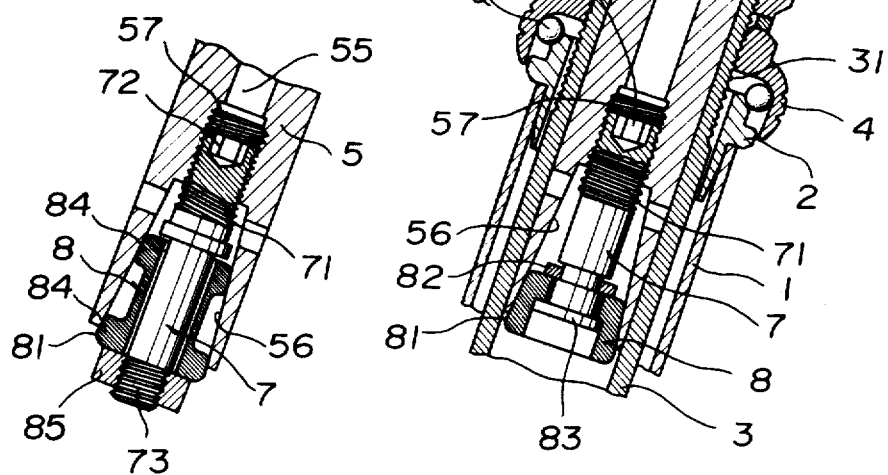

FIXING DEVICE FOR FIXING A HANDLE STEM TO A FRONT FORK AT A BICYCLE

This is a continuation of application Ser. No. 55,390, filed July 6, 1979, now abandoned.

This invention relates to a fixing device for fixing a handle stem to a front fork of a bicycle.

Generally, this kind of fixing device comprises a handle expander bolt controllable in rotation and an expander cone. The expander bolt passes through the hollow handle stem from the top thereof, carries at the lower end the expander cone screwed therewith, and has at the top a head larger in diameter than a central through hole of the same. The handle stem is tapered downwardly at its lower end portion and the expander cone is tapered upwardly to be engageable with the tapered surface of handle stem. The expander bolt is controlled in rotation to allow the expander cone to move upward and engage at its tapered surface with the tapered surface of the handle stem, whereby the handle stem is shifted radially outwardly or expanded in diameter and pressed onto the inner periphery of the front fork. Hence, the handle stem is secured to the front fork by frictional resistance therebetween, or the frictional resistance plus contact resistance of the cone with the handle stem.

The bicycle, once assembled, is rarely dismantled in usual cases. A touring bicycle, however, is sometimes roughly dismantled to be packed in a carry-bag and transported by car or train and then later reassembled. In this instance, the handle stem must be drawn out of the front fork in order to dismantle the bicycle.

The handle stem, once fixed, is held tight by the cone through wedge action applied to the tapered surfaces of both the handle stem and expander cone. Furthermore, water or the like enters the contact portion between the handle stem and the cone and rust produced thereat jams the cone immovable to hinder it from leaving the handle stem, as a result, the handle stem cannot be easily drawn out of the front fork.

Hence, the expander bolt is turned a certain extent and then hammered at the head thereof to impact the cone to forcibly removed it from the stem. This method of drawing out the stem is troublesome and damages the head of the bolt as well as the screw threads at the expander bolt and cone so as to cause them not to be reusable.

The conventional handle stem fixing device as aforegoing often employs an expander bolt about equal in length to the handle stem so that a longer bolt is necessary to pass therethrough, which is a factor increasing the weight of the bicycle.

On the other hand, a fixing device using a short expander bolt to reduce the weight of bicycle has been proposed, in which the handle stem is provided at the inner periphery of lower portion thereof with an annular retainer to which the head of the expander bolt is retained. A tool is inserted from the top of stem to turn the head to thereby move the expander cone vertically.

The latter fixing device has a larger diameter head on the handle expander bolt to oblige the handle stem to be enlarged in its inner diameter, as a result, the handle stem becomes smaller in thickness and weak in strength.

This invention has been designed to overcome the aforesaid problems. A main object of the invention is to provide a fixing device for fixing the handle stem to the front fork, by which the handle stem, especially when fixed to the front fork, is simply and reliably drawn out therefrom as well as fixed thereto. Another object is to provide a fixing device whose handle expander bolt is made smaller in length without deteriorating the strength of the handle stem to thereby reduce the weight of the bicycle.

It has been found by the inventor that the aforesaid problems in the conventional fixing device have been caused by the retention of the expander bolt head at the top of the handle stem or a retainer provided in the stem. In other words, when the expander bolt is turned to raise the expander cone, the head of bolt is retained not-movably to the top of handle stem or retainer therein to thereby ensure the upward movement of cone. However, when moving the cone downwardly to remove the handle stem from the front fork, the expander cone, when under a rigid condition, causes the expander bolt to be turned only with respect to the cone but not to forcibly move the cone downwardly to depart from the handle stem.

Accordingly, the fixing device of the invention is so constructed that a screw thread is provided at the inner periphery of the hollow handle stem with which the expander bolt having a rotary control is screwed, the expander bolt carrying the expander cone, so that the expander bolt is screwed forward and backward with the thread, thereby moving the expander cone with respect to the handle stem. Hence, even when jammed to the handle stem, or handle stem and front fork, the expander cone reliably departs from the handle stem to thereby facilitate removal of the handle stem from the front fork.

Figure 4:
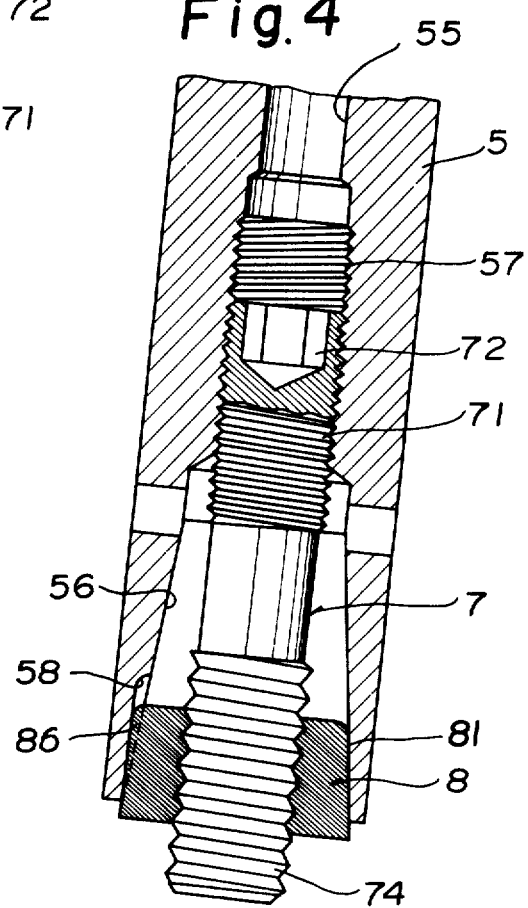

These and other objects and novel features of the invention will become apparent from the description of the embodiment thereof taken in accordance with the accompanying drawings, in which:

FIG. 1 is a sectional view of a handle stem fixed to the front fork, the handle stem using an embodiment of the fixing device of the invention, FIG. 2 is a sectional view of a modified embodiment with respect to the expander cone holding construction of FIG. 1, and FIG. 3 and 4 are enlarged sectional views of other modified embodiments of the invention.

Referring to FIG. 1, reference numeral 1 designates a head tube of the bicycle. The head tube 1 has at its upper end a top cone 2 fixed thereto and at the lower end a bottom ball head cup (not shown) fixed thereto.

Reference numeral 3 designates a front fork, which carries a front wheel (not shown) of the bicycle and is inserted into the head tube 1. At the outer periphery of upper end of front fork 3 is provided a screw thread 31. The screw thread 31 is screwed with a top ball cup 4 opposite to the top cone 2. A crown cone (not shown) opposite to the bottom ball head cup is press-fit onto the front fork 3 at the lower side thereof, spaced from the thread 31 at a regular interval, so that balls a inserted between each cup and cone support the front fork 3 rotatably with respect to the head tube 1.

Into the upper portion of front fork 3 is inserted a handle stem 5 having a lower portion thereby to be fixed by a fixing device to be hereinafter described. The handle stem 5 has at its top a projection 51 extending horizontally, the projection 51 carrying at its end a handle bar 6.

At the end of projection 51 is provided a handle bar holder 52, at the inner periphery of which a swingable pusher 53 is supported and screw means 54 is screwed with the inner thread at the end of projection 51. The screw means 54 is screwed forward by use of a tool, such as key wrench inserted into the projection 51 from a side opposite to the holder 52, whereby the pusher 53 biases the handle bar 6 to be fixed between the pusher 53 and the holder 52.

Next, an embodiment of the fixing device of the invention will be detailed.

The handle stem 5 has therein a vertical through hole 55, and at the lower end a plurality of slits (not shown) extending lengthwise of the handle stem 5. The lower end portion of the handle stem 5 is tapered downwardly to form an annular tapered surface 56 and a screw thread 57 of a given length is provided at the inner periphery of handle stem 5 above the tapered surface 56.

A handle expander bolt 7 has at its outer periphery of upper portion thereof a screw thread 71 in mesh with the thread 57 at the stem 5, at the upper end face a polygonal rotary control element 72 carved thereon, and at the lower end a flange 83. A conical expander cone 8 is rotatably mounted to the lower end portion of expander bolt 7 through flange 83 and a snap ring 82. The expander cone 8 is upwardly tapered at the outer periphery thereof to form a tapered surface 81 engageable with the tapered surface 56 at the handle stem 5.

The handle stem 5 is fixed to the front fork 3 in such a manner that the thread 71 at the expander bolt 7 is screwed with the thread 57 at the handle stem 5, and a tool, such as key wrench, is fit into the rotary control element 72 through the through hole 55 of handle stem 5, thereby rotating the expander bolt 7. The expander bolt 7 rotates to move upwardly and the expander cone 8 is forcibly raised to engage at its tapered surface 81 with the tapered surface 56 at the handle stem 5, thereby expanding the lower end portion of handle stem 5 radially outwardly. Hence, the handle stem 5 is pressed through its expanded lower end portion onto the inner surface of front fork 3 and is secured thereto through frictional resistance between both the handle stem 5 and the front fork 3.

On the contrary, the expander bolt 7 is rotated reversely to the direction of fixing the handle stem 5 as aforegoing, so that the expander cone 8 is subjected to thrust from the threads 57 and 71 so as to be forcibly moved downwardly even when jammed to the handle stem 5, and departs from the tapered surface 56 of handle stem 5. Hence, the handle stem 5 becomes free from the pressure by the cone 8 and is simultaneously released from contact pressure with the front fork 3, and can be drawn out of the front fork 3.

In addition, in FIG. 1, reference numeral 9 designates a cap covering/opening of handle stem 5.

The expander cone 8 may, as shown in FIG. 2, have the annular swollen portions 84 formed at the upper and lower portions thereof and tapered surfaces 81 respectively, and may be supported by a nut 85 in place of the snap ring 82. The nut 85 is screwed with a screw thread 73 formed at the lower end of expander bolt 7 so that the expander cone 8 may be rotatably mounted to the expander bolt 7.

The expander cone 8, other than being supported to the expander bolts 7 as shown in FIGS. 1 and 2, may be screwed with the expander bolt 7 as shown in FIGS. 3 and 4.

Referring to FIGS. 3 and 4, the expander bolt 7 is provided at the outer periphery of its upper portion with a first screw thread 71 in mesh with the thread 57 at the handle stem 5 similarly to the former embodiment and at the outer periphery of the lower portion with a second screw thread 74 with which the expander cone 8 is screwed, so that the cone 8 may be moved relative to the expander bolt 7 which is controlled in rotation to move with respect to the handle stem 5.

Also, referring to FIGS. 3 and 4, a groove 58 is provided at the inner periphery of handle stem 5 and extending lengthwise thereof, and a projection 86 is provided at the tapered surface is of expander cone 8. The projection 86 is insertably engaged with the groove 58, thereby preventing the rotation of cone 8 together with the expander bolt 7 when rotated.

Referring to FIG. 3, the first and second screw threads 71 and 74 are cut mutually in the reverse direction so that when the expander bolt 7 is rotated to move downwardly, the expander cone 8 moves upwardly, thereby radially expanding the handle stem 5 to be secured to the front fork 3. While, when the expander bolt 7 is rotated to move upwardly, the cone 8 moves downwardly, whereby, even when the cone 8 jams the handle stem 5, the thrust of thread forcibly eliminates the jam, thus permitting the quick and ready removal of the handle stem 5 from the front fork 3.

Referring to FIG. 4, the first and second threads 71 and 74 are cut in the same direction and pitch of the latter is made larger than that of the former, so that the expander cone 8 may move vertically to a greater extent than the expander bolt 7. Hence, the expander bolt 7 is rotated to move upwardly and the cone 8 moves upwardly more quickly than the bolt 7, thereby quickly fixing the handle stem 5 to the front fork 3. While, when rotated to move downwardly, the expander bolt 7 causes the expander cone 8 to move downwardly more quickly than the bolt. Hence, the cone 8, even when jammed, is subjected to the thrust of threads so as to be forcibly removed from the handle stem 5, thus permitting rapid and ready drawing of the handle stem 5 out of the front fork 3.

As clearly understood from the aforesaid description, the fixing device of the invention is so constructed that the handle stem has, at the inner periphery of lower portion thereof, a screw thread with which the handle expander bolt carrying the expander cone is screwed, the expander bolt being rotated to move the cone by means of a thrust caused by the threads, thereby fixing or removing the handle stem to or from the front fork. Hence, the handle stem, even when jammed, can be reliably and simply drawn out of the front fork. Only the rotation of the expander bolt is required to draw out the handle stem thereby eliminating the need for impacting the expander bolt at its head as conventional and avoiding a breakdown of the expander bolt making it reusable.

Furthermore, the expander bolt of the invention is considerably smaller in length than the handle stem without the need for providing a head of a larger diameter than an inner diameter of the handle stem, and for retaining the head to the retainer within the stem, as a result, the through hole of handle stem is made smaller in diameter to that extent. Hence, the handle stem need not be made smaller in thickness as conventional, so that the handle stem may retain a sufficient strength by use of the short expander bolt, thereby enabling the bicycle to be light in weight.

While exemplary embodiments of the invention have been shown and described, the invention is not limited to the specific construction thereof, as many modifications can be made within the spirit and scope of the invention which is defined by the following claims.

What is claimed is:

1. A handle stem for a bicycle front fork comprising: a horizontal projecting portion having at a distal end thereof a handle bar holder and defining an axially central horizontally extending through hole, said handle bar holder comprising a handle bar retaining area, a pusher element facing the interior of said retaining area for engaging with a handle bar and screw means engaging with a screw thread provided in said horizontal through hole for biasing said pusher element toward the center of said retaining area; a vertically projecting portion comprising a vertical cylindrical member defining an axially central vertical through hole, an interior tapered surface at a portion of said vertical through hole, and an inner peripheral screw thread on said vertical through hole spaced from adjacent and above said tapered surface and spaced from and below the top of said cylindrical member; and, a handle expander assembly mounted within said vertical through hole and comprising a handle expander bolt having a length which is less than the length of said vertical through hole, a rotary control element for rotating said bolt, a screw thread on the outer periphery of said expander bolt in engagement with the screw thread of said cylindrical member, and an expander cone having a tapered surface complementary to the tapered surfacce of said cylindrical member and carried by said expander bolt, said expander cone being vertically movable upon rotation of said expander bolt imparted by said rotary control element such that its tapered surface moves into engagement with or disengagement from the tapered surface of said cylindrical member to control the radial expansion of said cylindrical member and the locking thereof to said front fork; said horizontal and vertical through holes terminating in a common area permitting access to said screw means and rotary control element through said horizontal and vertical through holes, said expander bolt having a length which prevents its projection into said common area.

2. A handle stem as in claim 1 further comprising a removable cap for covering said common area.

3. A handle stem as in claim 1, wherein a first screw thread is provided at the outer periphery of an upper portion of said handle expander bolt, said first screw thread being screwable with the thread of said cylindrical member and a second screw thread is provided at the outer periphery of a lower portion of said handle expander bolt, said second screw thread being screwable with said expander cone, so that when said handle expander bolt is controlled in rotation, said expander cone is adapted to move relative to said handle expander bolt, the latter of which moves with respect to said cylindrical member.

4. A handle stem as in claim 3, wherein said first screw thread is cut in the reverse direction to said second screw thread, so that when said handle expander bolt is controlled in rotation to be moved vertically of said cylindrical member said expander cone is adapted to move in the direction reverse to movement of said handle expander bolt.

5. A handle stem as in claim 3, wherein said first and second screw threads are cut in the same direction and the pitch of said second screw thread is larger than that of said first screw thread, so that when said handle expander bolt is controlled in rotation to be moved vertically of said handle stem said expander cone is movable to a larger extent than said handle expander bolt.

* * * * *